United States Patent
Baudelocque et al.

(10) Patent No.: US 7,545,066 B2
(45) Date of Patent: Jun. 9, 2009

(54) JACKETED ACTIVE MAGNETIC BEARING

(75) Inventors: Luc Baudelocque, Vernon (FR); Armand Lapierre, Fontaine Sous Jouy (FR); Maurice Brunet, Sainte Colombe Pres Vernon (FR); Michel Lacour, Vernon (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 0 days.

(21) Appl. No.: 11/709,957

(22) Filed: Feb. 23, 2007

(65) Prior Publication Data
US 2007/0200443 A1 Aug. 30, 2007

(30) Foreign Application Priority Data
Feb. 27, 2006 (FR) .................................. 06 50671

(51) Int. Cl.
*H02K 7/09* (2006.01)
(52) U.S. Cl. .................. 310/90.5; 310/104; 310/43; 310/45
(58) Field of Classification Search ................ 310/90.5, 310/104, 43, 45
See application file for complete search history.

(56) References Cited

U.S. PATENT DOCUMENTS

| | | | |
|---|---|---|---|
| 4,353,602 A * | 10/1982 | Habermann | 310/90.5 |
| 4,500,142 A | 2/1985 | Brunet | |
| 4,806,835 A * | 2/1989 | Habermann | 318/607 |
| 5,021,697 A * | 6/1991 | Kralick | 310/90.5 |
| 5,693,994 A * | 12/1997 | New | 310/90.5 |
| 5,818,137 A * | 10/1998 | Nichols et al. | 310/90.5 |
| 5,973,430 A * | 10/1999 | Brunet | 310/90.5 |
| 6,350,109 B1 * | 2/2002 | Brunet et al. | 417/365 |
| 6,373,156 B2 * | 4/2002 | Suzuki et al. | 310/68 B |
| 6,464,472 B1 * | 10/2002 | Sekiguchi et al. | 417/351 |
| 2004/0164632 A1 * | 8/2004 | Brunet et al. | 310/90.5 |

FOREIGN PATENT DOCUMENTS

| | | |
|---|---|---|
| EP | 0 097 590 | 1/1984 |
| FR | 2632354 A1 * | 12/1989 |
| GB | 1 257 423 | 12/1971 |
| GB | 2 365 346 | 2/2002 |

* cited by examiner

*Primary Examiner*—Quyen P Leung
*Assistant Examiner*—Alex W Mok
(74) *Attorney, Agent, or Firm*—Weingarten, Schurgin, Gagnebin & Lebovici LLP

(57) ABSTRACT

The jacketed active magnetic bearing is applied to a rotary machine having a rotor in contact with a process gas and placed in a leaktight enclosure. The magnetic stator is protected by a first jacket of magnetic anti-corrosion material that constitutes a portion of the leaktight enclosure and that is secured to the bearing stator, and the detector stator is protected by a second jacket of non-magnetic anti-corrosion material that constitutes a portion of the leaktight enclosure and that is secured to the detector stator. The bearing armature and the detector armature can be made of a laminated magnetic identical to that of the first jacket.

11 Claims, 2 Drawing Sheets

JACKETED ACTIVE MAGNETIC BEARING

This application claims priority to French application No. 06 50,671 filed Feb. 27, 2006.

The present invention relates to a jacketed active magnetic bearing for a rotary machine having a rotor in contact with a process gas and placed in a leaktight enclosure, the magnetic bearing comprising a bearing armature of laminated magnetic material secured to the rotor and placed inside said leaktight enclosure, a bearing stator made up of electromagnet windings associated with a yoke of laminated magnetic material that presents end pole pieces disposed at a short distance from said bearing armature but without making contact therewith, the bearing stator being disposed outside said leaktight enclosure, at least one position detector of the electromagnetic type comprising a detector armature of laminated magnetic material mounted on the rotor inside the leaktight enclosure and a detector stator comprising electromagnet windings associated with a yoke of laminated magnetic material, the detector stator being disposed outside said leaktight enclosure, and electronic control circuits connected to said bearing electromagnet windings and to said detector electromagnet windings.

BACKGROUND OF THE INVENTION

Applications of magnetic bearings to rotary machines are becoming more and more widespread, in particular for applications relating to natural gas and applications relating to corrosive gases.

At present, numerous applications already make use of the major advantage of a magnetic bearing whereby it can operate directly in the process gas of the machine in question, without any sealing. This is true of turboexpanders for processing natural gas, refrigerator compressors, electric motors for driving compressors, etc.

Nevertheless, there remain certain conditions to be satisfied in the event of the gas being either acid, or corrosive, or carrying particles.

Under such circumstances, it is essential to protect the coils of the bearing and the associated detector by using sealing or anti-corrosion protection technologies.

These techniques may be:

either impregnation with varnish implemented under a vacuum and under pressure so as to ensure that the assembly is practically sealed against its surroundings;

or jacketed bearings in which the stator portion of the bearing and of the detector are protected by a metal jacket made of a material that does not oxidize or corrode.

The jacketed bearing technique has already been used industrially on compressors for storing natural gas, with a single metal jacket being implemented to protect both the bearing proper and the detector that is associated therewith.

FIG. 1 shows an example of a known jacketed radial active magnetic bearing.

A bearing armature 21 of laminated magnetic material is secured to the rotor 20 which is in contact with the process gas. Similarly, a detector armature 22 of laminated magnetic material is fitted on the rotor 20 and is likewise in contact with the process gas.

An airgap 6 having a thickness of about 0.3 millimeters (mm) to 0.5 mm separates the peripheral portion of the rotor 20 fitted with the armatures 21 and 22 from a single jacket 5 that is fitted on and secured to a common housing 11, 12, 13, 14 that incorporates both the stator of the bearing and the stator of the detector.

The stator of the bearing comprises electromagnet windings 32 associated with a yoke 31 of laminated magnetic material that presents end pole pieces in contact with the jacket 5 defining the airgap of the bearing 6.

The stator of the detector also comprises electromagnet windings 42 associated with a yoke 41 of laminated magnetic material that is in contact with the single jacket 5.

A potting compound 33, 43 may be injected into the leaktight housing 10 comprising the parts 11, 12, 13, 14 and the jacket 5 so as to embed the electromagnet windings 32, 42 in the potting compound in order to reinforce its mechanical strength.

The electromagnet windings 32, 42 of the bearing and of the detector are connected to electronic control circuits 60 that can be located outside the housing of the bearing.

The use of a single jacket 5 to define a leakproof wall both for the bearing and for the associated detector leads to making a jacket 5 of relatively great length, and that can lead to problems of differential thermal expansion between the jacket and the housing of the bearing.

Furthermore, the use of a single jacket that is common to the bearing and to the detector generally leads to problems of electrical and magnetic coupling, in particular in mean frequency ranges above 300 hertz (Hz). Such coupling has a strong negative influence on the transfer functions of systems for controlling magnetic bearings.

The common jacket 5 is made of a non-magnetic metallic material so that the inductive detector does not lose all of its sensitivity because of the presence of the protective jacket 5.

In order to withstand operating conditions (pressure, fast variations in pressure, temperature, ability to withstand corrosion and abrasion), the jacket 5 generally presents thickness lying in the range 0.3 mm to 0.5 mm, i.e. thickness similar to that of the airgap proper of the magnetic bearing.

The presence of such a jacket 5 of non-magnetic material thus amounts to increasing the thickness of the airgap of the bearing by about 100%, which leads to a significant limit on the load available from said bearing.

OBJECTS AND SUMMARY OF THE INVENTION

An object of the present invention is to remedy the above drawbacks while conserving the very great benefit of the principle of jacketing bearings.

These objects are achieved by a jacketed active magnetic bearing for a rotary machine having a rotor in contact with a process gas and placed in a leaktight enclosure, the magnetic bearing comprising a bearing armature of laminated magnetic material secured to the rotor and placed inside said leaktight enclosure, a bearing stator made up of electromagnet windings associated with a yoke of laminated magnetic material that presents end pole pieces disposed at a short distance from said bearing armature but without making contact therewith, the bearing stator being disposed outside said leaktight enclosure, at least one position detector of the electromagnetic type comprising a detector armature of laminated magnetic material mounted on the rotor inside the leaktight enclosure and a detector stator comprising electromagnet windings associated with a yoke of laminated magnetic material, the detector stator being disposed outside said leaktight enclosure, and electronic control circuits connected to said bearing electromagnet windings and to said detector electromagnet windings, wherein the bearing stator is protected by a first jacket of magnetic anti-corrosion material which constitutes a portion of said leaktight enclosure and is secured to said bearing stator, wherein the detector stator is protected by a second jacket of non-magnetic anti-corrosion material that constitutes a portion of said leaktight enclosure and that is secured to said detector stator, wherein the first jacket is made of magnetic stainless steel of the 17/4 PH type, and wherein the second jacket is made of one of the materials constituted by a non-magnetic stainless steel of the AISI 304, 304L, 316, or 316L type, of Inconel, or of a superalloy.

According to a particular characteristic, the first jacket is welded on a first leaktight housing containing the bearing stator and the second jacket is welded on a second leaktight housing containing the detector stator.

Advantageously, the first leaktight housing containing the bearing stator and the second leaktight housing containing the detector stator are interconnected in leaktight manner in a zone that is remote from the first and second jackets.

The first and second leaktight housings are filled with a potting compound.

In a preferred embodiment, the bearing armature and the detector armature are made of thin magnetic laminations made of material identical to that of the first jacket.

Nevertheless, in another possible embodiment, the bearing armature and the detector armature are made of silicon-iron laminations covered in an anti-corrosion protection layer of the nickel, chromium, or ceramic type.

The invention is equally applicable to a radial bearing and to an axial bearing or indeed to a bearing that combines both a radial bearing and an axial bearing, such as a bearing of conical type.

The invention can be useful in particular when the position detector of the inductive type is fed with a carrier at a frequency lying in the range 20 kilohertz (kHz) to 40 kHz.

The invention makes it possible to retain a conventional airgap, with values lying in the range about 0.3 mm to about 0.5 mm, between the first jacket and the armature of the bearing, without the available load of the bearing being reduced by the presence of the first and second jackets.

BRIEF DESCRIPTION OF THE DRAWINGS

Other characteristics and advantages of the invention appear from the following description of particular embodiments of the invention given by way of example with reference to the accompanying drawings, in which.

MORE DETAILED DESCRIPTION

Figure 1:
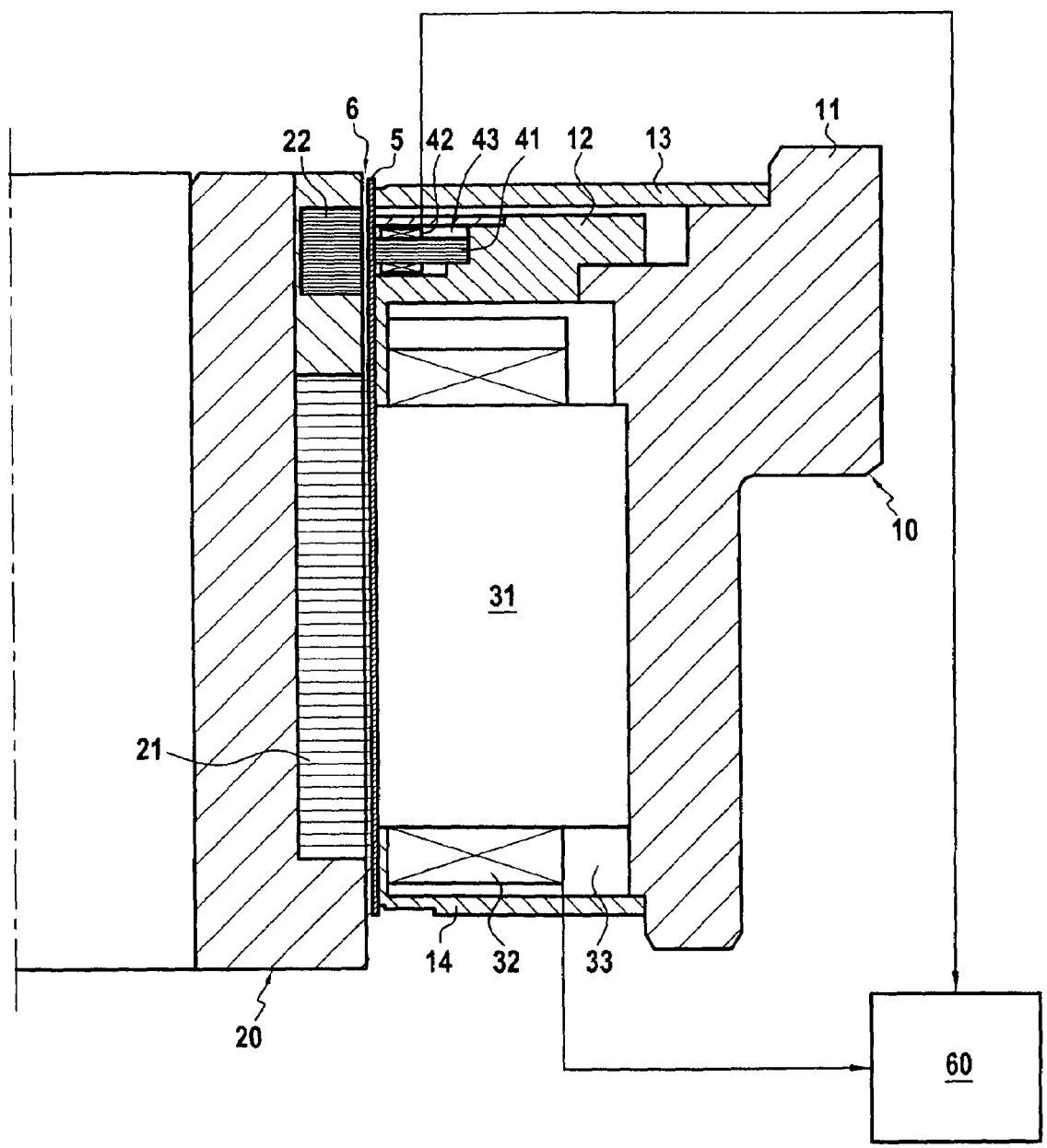
FIG. 1 is an axial half-section view of an example of a prior art jacketed active magnetic bearing.
Figure 2:
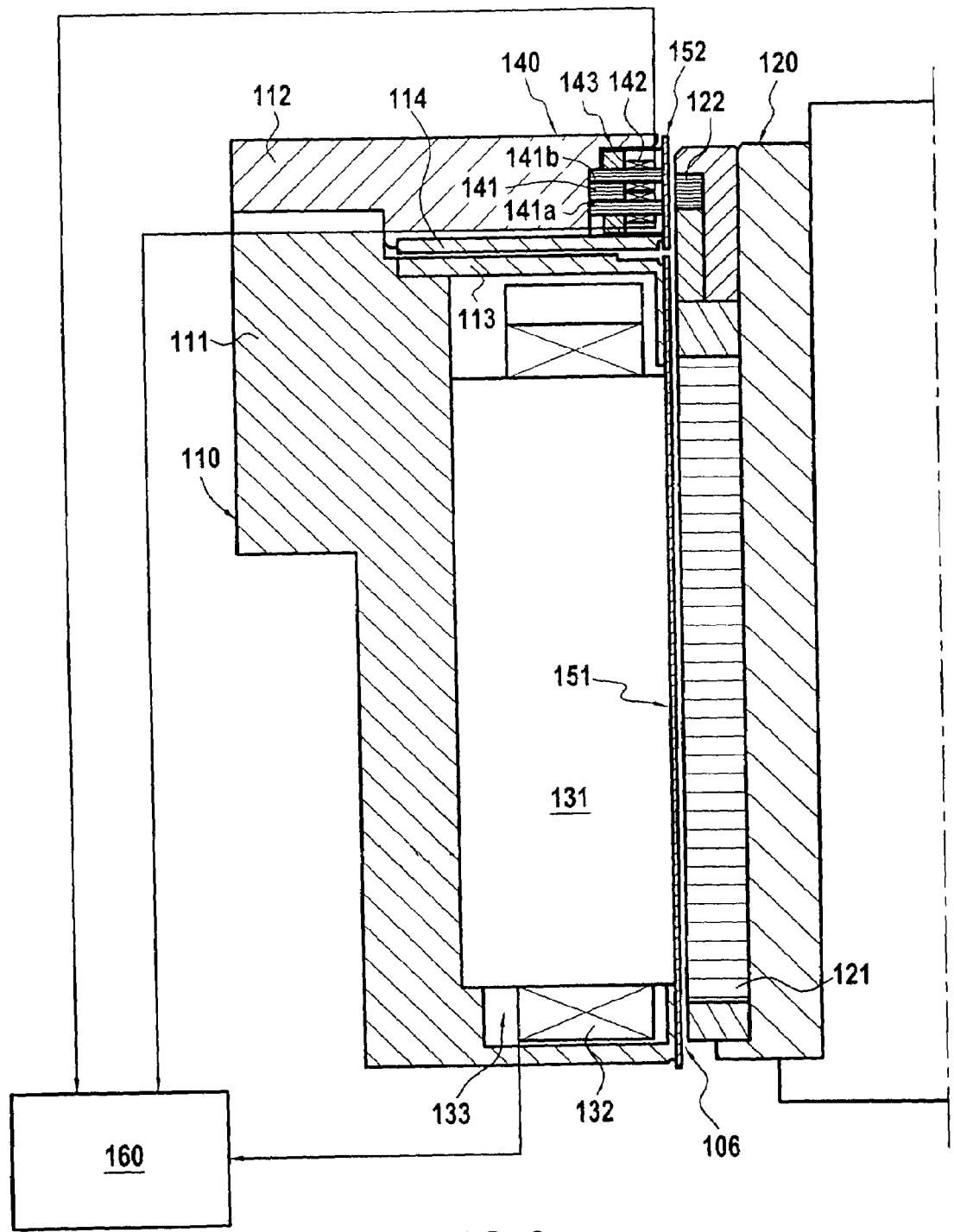
FIG. 2 is an axial half-section view of an example of a jacketed active magnetic bearing in accordance with the present invention.

With reference to FIG. 2, there can be seen a rotor 120 of a rotary machine that is designed to be in contact with a process gas, which gas may be acid, corrosive, or a carrier of particles.

By way of example, the rotary machine may be a turboexpander for processing natural gas, a refrigerator compressor, or an electric motor for driving a compressor.

A bearing armature 121 of laminated magnetic material is applied to the rotor 120. This armature 121 may in particular make use of the 17/14 PH stainless material that is available in laminations of small thickness, in particular presenting a thickness of 0.2 mm.

A detector armature 122, likewise in laminated magnetic material, is fitted on the rotor 120, in the vicinity of the bearing armature 121. Like the armature 121, this armature 122 may be made of a 17/4 PH stainless material.

An airgap 106 presenting thickness that lies for example in the range 0.3 mm to 0.5 mm is provided firstly between the peripheral portion of the rotor 120 fitted with the bearing armature 121 and the detector armature 122, and secondly a first jacket 151 constituting a bearing jacket and a second jacket 152 constituting a detector jacket.

The first jacket 151 is welded in leaktight manner to parts 113, 111 co-operating with the first jacket 151 to constitute a leaktight housing containing the elements constituting the stator of the magnetic bearing, i.e. electromagnet windings 132 associated with a yoke 131 of laminated magnetic material.

The yoke 151 has end pole pieces in contact with the bearing jacket 151 which presents thickness that lies advantageously in the range 0.3 mm to 0.5 mm.

The first jacket 151 is made of a magnetic anti-corrosion material, thus avoiding any significant reduction in the load capacity of the bearing.

For example, the first jacket 151 can be made of a stainless steel of the 17/4 PH type, or of an equivalent type.

A potting compound 133 is introduced into the inside of the bearing housing 111, 113 in order to fill its empty spaces and improve its mechanical strength. The potting compound 133 that serves in particular to fill the empty spaces around the electromagnetic windings 132 of the bearing may be introduced using a vacuum and pressure type method so as to guarantee filling that is total and perfect.

The bearing housing 111, 113 associated with the bearing jacket 151 is sealed by welding the jacket 151 to the bearing housing 111, 113 which is made of a material that is compatible with that of the jacket 151, or preferably that is identical thereto.

The bearing armature 121 and the detector armature 122 can be made using thin magnetic laminations made out of a material that is identical to that of the bearing jacket 151, e.g. such as a stainless steel of the 17/4 PH or of an equivalent type.

In a variant, the bearing armature 121 may be made up of silicon iron laminations covered in an anti-corrosion protection layer of the nickel, chromium, or ceramic type.

A position detector comprises a stator that is disposed in a second housing 112, 114 that is distinct from the first housing 111, 113 and that is closed by a second jacket 152 that is welded in leaktight manner to the parts 112, 114 of the second housing.

The stator of the position detector comprises electromagnet windings 142 associated with a yoke 141 of laminated magnetic material.

In the example of FIG. 2, the yoke 141 comprises two stacks 141a, 141b each provided with electromagnet windings 142, each of the stacks 141a, 141b being placed facing the armature 122 in such a manner that in the rest position it is placed half facing the armature of the detector 122 and half facing a non-magnetic external portion of the rotor that enables the detector to act both as a radial position detector and as an axial position detector.

The second jacket 152 is made of a non-magnetic anti-corrosion material. It may present thickness lying in the range 0.3 mm to 0.5 mm.

The ends of the stacks 141a, 141b of the yoke 141 are in contact with the second jacket 152.

By way of example, the non-magnetic second jacket 152 may be made, for example, out of a stainless steel of the AISI 304, 304L, 316, or 316L type.

Other materials presenting similar properties and capable of being formed into laminations having a thickness of 0.3 mm to 0.5 mm could also be used for making the second jacket 152, for example Inconel or superalloys.

The second jacket 152 is welded to the parts 112, 114 of the detector housing, which is separate from the first housing 111, 113 and is made of a material that is compatible with the material of the jacket 152.

As for the bearing stator, a potting compound 143 is introduced into the detector housing 112, 114 in order to fill its empty spaces and improve its mechanical strength. The potting compound 143, which performs the same function as the above-describing potting compound 133, can be introduced using the same method.

The first leaktight housing 111, 113 containing the bearing stator and the second leaktight housing 112, 114 containing the detector stator are preferably connected together in leaktight manner in a zone that is remote from the first and second jackets 151, 152.

Thus, in FIG. 2, it can be seen that the first and second jackets 151, 152 are welded respectively to parts 113, 114 that are spaced apart mutually and that are connected to respective other parts 111, 112 respectively constituting the bodies of the bearing housing and of the detector housing.

The parts 111 and 112 belonging respectively to the bearing housing and to the detector housing are connected together in leaktight manner, e.g. by welding, at a certain distance from the zones in which the ends of the first and second jackets 151, 152 are welded respectively to the parts 113 and 114.

The physical separation of the bearing jacket 151 and the detector jacket 152 avoids any problems of coupling between the bearing and the detector and thus avoids all of the limitations on the electronic device 160 for controlling the magnetic bearing that might otherwise be associated with such coupling. The design of the electronic control device 160 to which the windings 132 of the bearing stator and the windings 142 of the detector stator are connected can therefore be simplified.

The inductive type position detector 140 can be fed with a carrier at a frequency lying in the range 20 kHz to 40 kHz. The jacket 152 which is made of non-magnetic material may optionally be conductive, but does not lead to any significant loss of sensitivity, thus making it possible to retain a high level of reliability for the magnetic suspension system.

The above description is made with reference to a radial type magnetic bearing, however it can be applied in like manner to a magnetic bearing of axial type or to a magnetic bearing of conical type combining the functions of a radial bearing and of an axial bearing.

The leaktight assembly 110 constituted by the bearing housing with the first jacket 151 and the detector housing with the second jacket 152 can be connected in leaktight manner to the remainder of the casing constituting a leaktight enclosure surrounding the rotor 120 that is in contact with the process gas.

What is claimed is:

1. A jacketed active magnetic bearing for a rotary machine having a rotor in contact with a process gas and placed in a leaktight enclosure, the magnetic bearing comprising a bearing armature of laminated magnetic material secured to the rotor and placed inside said leaktight enclosure, a bearing stator made up of electromagnet windings associated with a yoke of laminated magnetic material that presents end pole pieces disposed at a short distance from said bearing armature but without making contact therewith, the bearing stator being disposed outside said leaktight enclosure, at least one position detector of the electromagnetic type comprising a detecter armature of laminated magnetic material mounted on the rotor inside the leaktight enclosure and a detector stator comprising electromagnet windings associated with a yoke of laminated magnetic material, the detector stator being disposed outside said leaktight enclosure, and electronic control circuits connected to said bearing electromagnet windings and to said detector electromagnet windings, wherein the bearing stator is protected by a first jacket of magnetic anti-corrosion material which constitutes a portion of said leaktight enclosure and is secured to said bearing stator, wherein the detector stator is protected by a second jacket of non-magnetic anti-corrosion material that constitutes a portion of said leaktight enclosure and that is secured to said detector stator, wherein the first jacket is made of magnetic stainless steel of the 17/4 PH type, and wherein the second jacket is made of one of the materials constituted by a non-magnetic stainless steel of the AISI 304, 304L, 316, or 316L type, of Inconel, or of a superalloy.

2. An active magnetic bearing according to claim 1, wherein the first and second jackets present thickness lying in the range 0.3 mm to 0.5 mm.

3. An active magnetic bearing according to claim 1, wherein the first jacket is welded on a first leaktight housing containing the bearing stator and the second jacket is welded on a second leaktight housing containing the detector stator.

4. An active magnetic bearing according to claim 3, wherein the first leaktight housing containing the bearing stator and the second leaktight housing containing the detector stator are interconnected in leaktight manner in a zone that is remote from the first and second jackets.

5. An active magnetic bearing according to claim 3, wherein the first and second leaktight housings are filled with a potting compound.

6. An active magnetic bearing according to claim 1, wherein the bearing armature and the detector armature are made of thin magnetic laminations made of material identical to that of the first jacket.

7. An active magnetic bearing according to claim 1, wherein the bearing armature and the detector armature are made of silicon iron laminations covered in an anti-corrosion protection layer of the nickel, chromium, or ceramic type.

8. An active magnetic bearing according to claim 1, constituting a radial bearing.

9. An active magnetic bearing according to claim 1, constituting an axial bearing.

10. An active magnetic bearing according to claim 1, wherein the position detector of the inductive type is fed with a carrier at a frequency lying in the range 20 kHz to 40 kHz.

11. An active magnetic bearing according to claim 1, wherein an airgap of the magnetic bearing situated between the first jacket and the bearing armature lies in the range 0.3 mm to 0.5 mm.

* * * * *